US009188667B2

(12) United States Patent
Kajiki

(10) Patent No.: US 9,188,667 B2
(45) Date of Patent: Nov. 17, 2015

(54) MOVING OBJECT DETECTING APPARATUS, MOVING OBJECT DETECTING METHOD, AND COMPUTER READABLE RECORDING MEDIUM

(75) Inventor: Junko Kajiki, Kawasaki (JP)

(73) Assignee: FUJITSU LIMITED, Kawasaki (JP)

( * ) Notice: Subject to any disclaimer, the term of this patent is extended or adjusted under 35 U.S.C. 154(b) by 208 days.

(21) Appl. No.: 13/592,686

(22) Filed: Aug. 23, 2012

(65) Prior Publication Data
US 2014/0253363 A1 Sep. 11, 2014

(30) Foreign Application Priority Data
Aug. 30, 2011 (JP) ................ 2011-187074

(51) Int. Cl.
G01S 13/04 (2006.01)
G01S 13/536 (2006.01)
G01S 13/91 (2006.01)

(52) U.S. Cl.
CPC .............. *G01S 13/04* (2013.01); *G01S 13/536* (2013.01); *G01S 13/91* (2013.01)

(58) Field of Classification Search
CPC ................... G01S 13/04; G01S 13/52–13/56; G01S 13/536; G01S 13/91
USPC ............ 342/28, 89–97, 159–164, 192
See application file for complete search history.

(56) References Cited

U.S. PATENT DOCUMENTS

| 3,573,824 | A | * | 4/1971 | Armstrong et al. | 342/26 D |
| 3,582,872 | A | * | 6/1971 | Prager | 367/122 |
| 3,587,097 | A | * | 6/1971 | Stull, Jr. | 342/93 |
| 3,631,488 | A | * | 12/1971 | Evans | 342/162 |
| 3,720,942 | A | * | 3/1973 | Wilmot et al. | 342/90 |
| 3,942,178 | A | * | 3/1976 | Hackett | 342/28 |
| 3,968,490 | A | * | 7/1976 | Gostin | 342/93 |
| 4,001,826 | A | * | 1/1977 | Moulton | 342/110 |
| 4,077,038 | A | * | 2/1978 | Heller et al. | 342/92 |
| 4,217,583 | A | * | 8/1980 | Hiller et al. | 342/149 |
| 4,339,754 | A | * | 7/1982 | Hammers et al. | 342/89 |

(Continued)

FOREIGN PATENT DOCUMENTS

EP 0443243 A2 8/1991
GB 1232816 5/1971

(Continued)

OTHER PUBLICATIONS

Extended European Search Report mailed Dec. 19, 2012 issued in corresponding European Patent Application No. 12181652.4.

(Continued)

Primary Examiner — John B Sotomayor
(74) Attorney, Agent, or Firm — Staas & Halsey LLP

(57) ABSTRACT

There is provided an apparatus that detects a moving object which includes an interface unit to receive, from a radar, measurement data of a distance from the radar and a reception level signal reflected by an object located at the distance from the radar; a background data updating unit to detect the reception level signal that is greater than or equal to a first threshold from each of a plurality of the measurement data, a background value that indicates a generation frequency for levels of the reception level signal that become greater than or equal to the first threshold; a moving object detecting unit to detect the object as a moving object, the object having the background value that is less than a background value of a stationary object that is located in same distance of the object.

4 Claims, 6 Drawing Sheets

(56) References Cited

U.S. PATENT DOCUMENTS

| | | | | |
|---|---|---|---|---|
| 4,463,356 | A | * | 7/1984 | Short et al. ............... 342/94 |
| 4,536,764 | A | * | 8/1985 | Freeman ............... 342/91 |
| 4,633,254 | A | * | 12/1986 | Giaccari ............... 342/91 |
| 5,061,934 | A | * | 10/1991 | Brown et al. ............... 342/162 |
| 5,525,996 | A | * | 6/1996 | Aker et al. ............... 342/104 |
| 5,528,245 | A | * | 6/1996 | Aker et al. ............... 342/104 |
| 5,563,603 | A | * | 10/1996 | Aker et al. ............... 342/115 |
| 5,565,871 | A | * | 10/1996 | Aker et al. ............... 342/176 |
| 5,570,093 | A | * | 10/1996 | Aker et al. ............... 342/104 |
| 5,691,724 | A | * | 11/1997 | Aker et al. ............... 342/104 |
| 7,737,881 | B2 | * | 6/2010 | Stove ............... 342/93 |
| 8,823,579 | B2 | * | 9/2014 | Edwards ............... 342/104 |
| 8,823,580 | B2 | * | 9/2014 | Gross et al. ............... 342/109 |
| 2012/0007773 | A1 | * | 1/2012 | Smith ............... 342/195 |

FOREIGN PATENT DOCUMENTS

| | | | |
|---|---|---|---|
| GB | 2104333 A | | 3/1983 |
| JP | 2000-172980 | | 6/2000 |
| JP | 2002-99986 | | 4/2002 |
| JP | 2002099986 A | * | 4/2002 |
| JP | 2010-210483 | | 9/2010 |

OTHER PUBLICATIONS

Office Action mailed Jan. 20, 2015 for corresponding Japanese Patent Application No. 2011-187074, five pages.

* cited by examiner

MOVING OBJECT DETECTING APPARATUS, MOVING OBJECT DETECTING METHOD, AND COMPUTER READABLE RECORDING MEDIUM

CROSS-REFERENCE TO RELATED APPLICATION

This application is based upon and claims the benefit of priority of the prior Japanese Patent Application No. 2011-187074, filed on Aug. 30, 2011, the entire contents of which are incorporated herein by reference.

FIELD

The embodiments discussed herein are related to, for example, a moving object detecting apparatus, a moving object detecting method, and a computer program for detecting a moving object where the detection is based on data measured by a radar.

BACKGROUND

There is a known technology that detects a vehicle traveling on a road based on data measured by a radar in order to collect information regarding, for example, traffic volume. A system to detect a travelling vehicle needs to avoid erroneously detecting a stationary body as a travelling vehicle. Here a stationary body may include a fixed object such as, for example, a guardrail or an object that does not move for a given period of time such as, for example, a stopped vehicle. Therefore, a technology is proposed that acquires background data indicating the position of a stationary object and detects a travelling vehicle by excluding the position of the stationary object, which is indicated by the background data, from the data measured by a radar. See, for example, Japanese Laid-Open Patent Publication Nos. 2000-172980 and 2002-99986.

For example, an obstacle detecting method disclosed in Japanese Laid-Open Patent Publication No. 2000-172980 performs processing to detect an obstacle candidate from a difference between scanning data obtained using a millimeter wave sensor installed by a road and background data that does not include an obstacle. The method then repeats the process and detects an obstacle when the obstacle candidate continues to be present. A traveling vehicle detecting method disclosed in Japanese Laid-Open Patent Publication No. 2002-99986 tracks a vehicle with every scan of a millimeter wave radar installed above the road and detects a travelling vehicle using the acquired tracking data. In the traveling vehicle detecting method, the data of a fixed object such as a guardrail is eliminated by subtracting the background data from the scanning data.

In particular, Japanese Laid-Open Patent Publication Nos. 2000-172980 and 2002-99986 disclose that the background data is updated by adding, to the background data, a value acquired by multiplying the gradation data prepared from the measurement data in each of the distances within a detection range of the radar by a forgetting coefficient.

SUMMARY

According to an aspect of the invention, an apparatus that detects a moving object includes an interface unit configured to receive, from a radar, measurement data that includes at least one pair of a distance from the radar and a reception level signal that indicates a strength of a radar wave reflected by an object located at the distance from the radar, a background data updating unit configured to detect the reception level signal that is greater than or equal to a first threshold from each of a plurality of the measurement data and acquire, for each distance from the rader, a background value that indicates a generation frequency for levels of the reception level signal that become greater than or equal to the first threshold, and a moving object detecting unit configured to detect the object as a moving object, the object having the background value that is less than a background value corresponding to a stationary object that is located in same distance of the object, wherein the object is one of objects that are located at a distance that corresponds to the reception level signal that has a strength greater than or equal to a second threshold in the measurement data, the second threshold being higher than the first threshold.

an interface unit configured to receive, from a radar, measurement data that includes at least one pair of a distance from the radar and a reception level signal that indicates a strength of a radar wave reflected by an object located at the distance from the radar; a background data updating unit configured to detect the reception level signal that is greater than or equal to a first threshold from each of a plurality of the measurement data and acquire a background value that indicates a generation frequency of the reception level signal that is greater than or equal to the first threshold, for each distance from the radar; and a moving object detecting unit configured to detect, in the measurement data, the object, located at a position where the background value of the object is less than a value that corresponds to a stationary object, among objects that are located at a distance that corresponds to the reception level signal that has a strength greater than or equal to a second threshold, which is higher than the first threshold, as the moving object.

The object and advantages of the invention are realized and attained by means of the elements and combinations particularly pointed out in the claims. It is to be understood that both the foregoing general description and the following detailed description are illustrative and explanatory and are not restrictive of the invention, as claimed.

DESCRIPTION OF EMBODIMENTS

The measurement data output from a radar includes a reception level signal that represents the strength of a radar wave (hereinafter, simply referred to as a reflected wave) reflected by an object and received by the radar, along with a distance from the radar to the object for each object reflecting the radar wave. However, the strength of the reflected wave varies according to environmental conditions, such as weather, or noise that overlaps the reflected wave. As a result, even in measurement data output from a radar, the strength of the reception level signal varies according to variations in the strength of the reflected wave.

In particular, when the strength of the wave reflected by the stationary object is low, the strength of the reception level signal corresponding to the stationary object may not reach a detectable level in some cases depending on the environmental conditions or noise. For that reason, in the technologies disclosed in Japanese Laid-Open Patent Publication Nos. 2000-172980 and 2002-99986 as described above, the background data may not be updated appropriately, and, as a result, the data corresponding to the distance from the radar to the stationary object may not be excluded from the measurement data. Thus, when the strength of the reception level signal corresponding to a stationary object in the measurement data reaches the level that may be detected by accident, the stationary object may be erroneously detected as a travelling vehicle by mistake.

An aspect of the present disclosure is directed to a moving object detecting apparatus that may prevent a stationary object that is present within a detection range of a radar from being erroneously detected as a moving object.

Below, a moving object detecting apparatus according to an illustrative embodiment is described with reference to the accompanying drawings.

The moving object detecting apparatus detects a vehicle that travels on the road as a moving object, for example, based on measurement data from a radar installed, for example, above the road. The moving object detecting apparatus sets a threshold for a reception level signal when updating background data, which indicates a position where a stopped object is present, to be lower than a threshold for a reception level signal when detecting the travelling vehicle. As a result, the moving object detecting apparatus may easily represent the stopped object, which is present within a detection range of the radar, in the background data in order to prevent the stopped object from being erroneously detected as a moving object.

Figure 1:
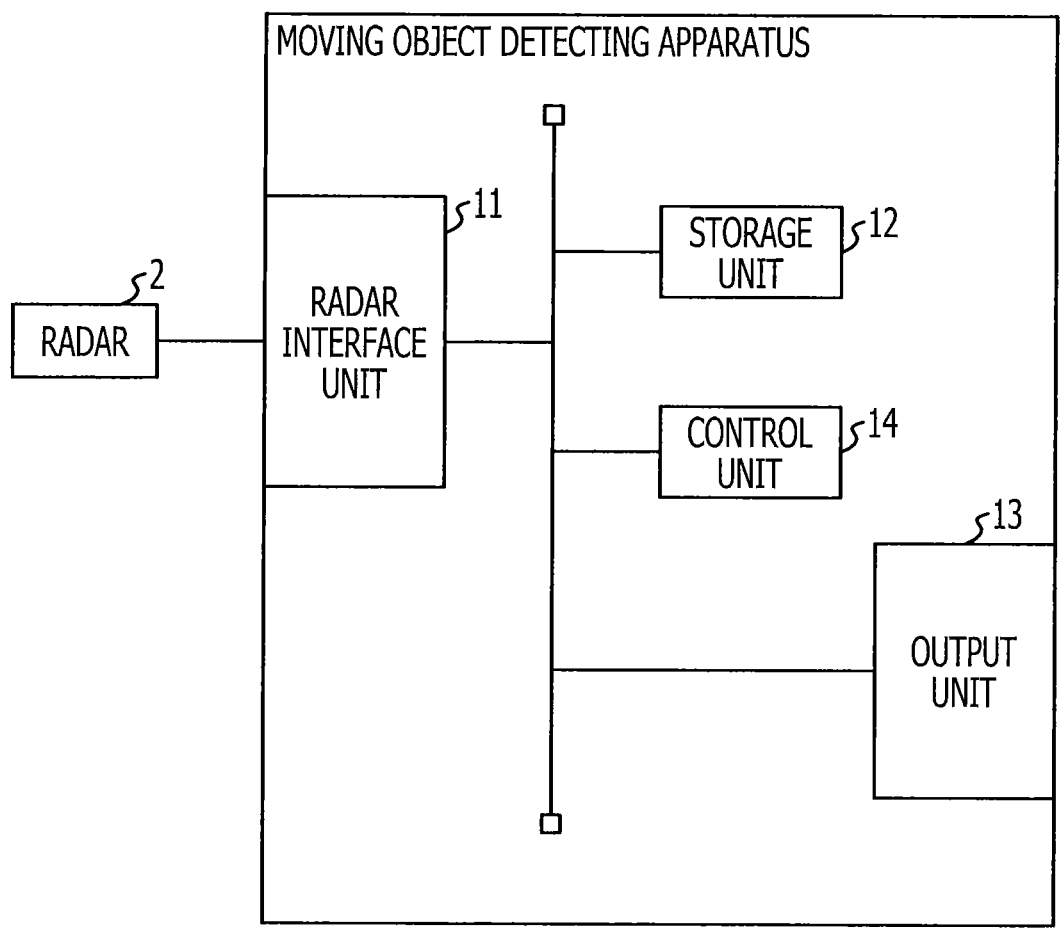
FIG. 1 depicts a schematic diagram of a moving object detecting apparatus according to an embodiment of the present disclosure.

FIG. 1 depicts a schematic diagram of a moving object detecting apparatus 1 according to an illustrative embodiment. The moving object detecting apparatus 1 includes a radar interface unit 11, a storage unit 12, an output unit 13, and a control unit 14. The moving object detecting apparatus 1 is connected to a radar 2 through the radar interface unit 11.

In the present embodiment, the radar 2 detects an object that reflects a radar wave using a frequency modulated continuous wave (FMCW) method. The radar 2 may be installed, for example, on a post provided by the side of a road where a vehicle travels. Alternatively, an existing radar detector installed to collect information such as traffic conditions of the road may be utilized as well.

The radar 2 includes a transmission antenna (not shown) and a reception antenna (not shown), and the direction of each antenna is adjusted to transmit the radar wave toward a moving vehicle on the road and receive the radar wave reflected by the vehicle. In the illustrative embodiment, the horizontal and vertical angles of radiation of the radar wave radiated from the transmission antenna of the radar 2 are set so that the road where a vehicle to be detected travels is included within the detection range of the radar 2.

The radar 2 mixes a portion of the radar wave transmitted from the transmission antenna, whose frequency is varied in a triangular wave, with a reflected wave detected by the reception antenna. Then the radar 2 generates a beat signal that represents a difference between the frequency of the reflected wave and the frequency of the radar wave for each of an ascending section in which the frequency increases and a descending section in which the frequency decreases. The radar 2 acquires the frequency of the reflected wave in the ascending section ($f_{up}$) and the frequency of the reflected wave in the descending section ($f_{down}$) based on the beat signal to calculate the distance up to the object reflecting the radar wave and the velocity of the object, and then outputs the measurement data at a given cycle (for example, 100 msec). The measurement data includes, for each of a plurality of positions set at a given distance interval, a group of measured values that include the reception level signal representing the strength of the reflected wave, a distance from the radar 2, and a moving velocity of an object. The given distance interval corresponds to the distance resolution of the radar 2, and is set, for example, in the range of 3 m to 10 m.

The radar interface unit 11 includes an interface circuit for connecting the moving object detecting apparatus 1 with the radar 2. The radar interface unit 11 may be a circuit compatible with either RS-232C or a serial communication standard such as universal serial bus (USB), or a circuit compatible with Ethernet (registered trademark). The radar interface unit 11 receives measurement data from the radar 2 and transfers the measurement data to the control unit 14.

The storage unit 12 includes, for example, a readable/writable semiconductor memory circuit and a read-only semiconductor memory circuit, and is used to detect a vehicle that travels within the detection range of the radar 2 and stores a computer program that runs on the control unit 14. The storage unit 12 also stores various data used to detect the travelling vehicle such as, for example, the measurement data and the background data received from the radar 2. The storage unit 12 may also store information on the detected vehicle such as a time when the vehicle was detected, a distance from the radar 2 to the detected vehicle, and the moving velocity of the vehicle.

The output unit 13 includes an interface circuit to connect the moving object detecting apparatus 1 with another apparatus such as, for example, a traffic management system. The interface circuit may be configured to be compatible with Ethernet (registered trademark). The output unit 13 outputs information on the travelling vehicle received from the control unit 14 to another apparatus.

The control unit 14 controls the entirety of the moving object detecting apparatus 1 and detects a vehicle that travels within the detection range of the radar 2 as a moving object based on measurement data received from the radar 2. Thus, the control unit 14 includes at least one processor and a peripheral circuit.

Figure 2:
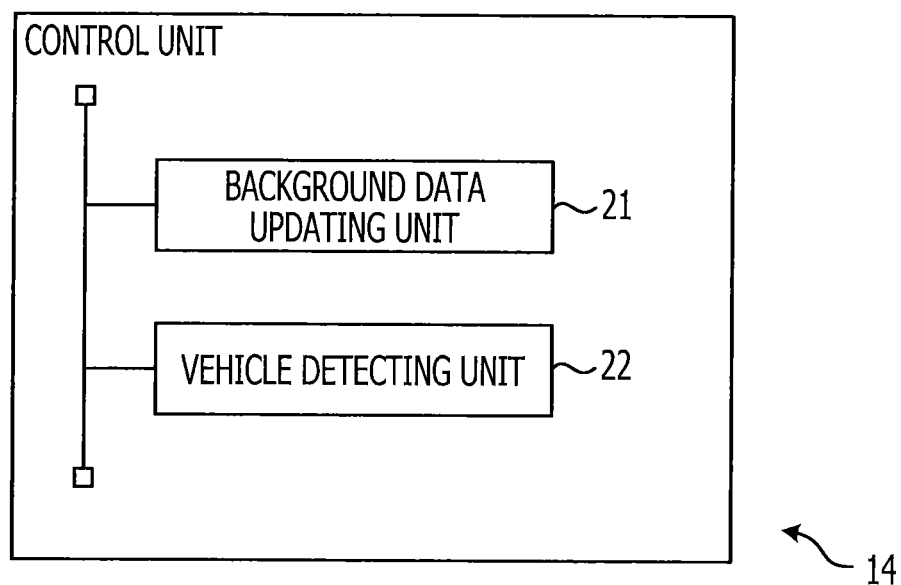
FIG. 2 depicts a functional block diagram of a control unit.

FIG. 2 depicts a functional block diagram of the control unit 14, which includes a background data updating unit 21 and a vehicle detecting unit 22. Each of the background data updating unit 21 and the vehicle detecting unit 22 of the control unit 14 is a functional module implemented by a computer program that is executed on a processor of the control unit 14. Alternatively, each of the background data updating unit 21 and the vehicle detecting unit 22 of the control unit 14 may be implemented in the moving object detecting apparatus 1 as an individual circuit.

The background data updating unit 21 updates the background data that represents the position of a stationary object that is present within the detection range of the radar 2 based on a plurality of measurement data received previously from the radar 2.

Figure 3A:
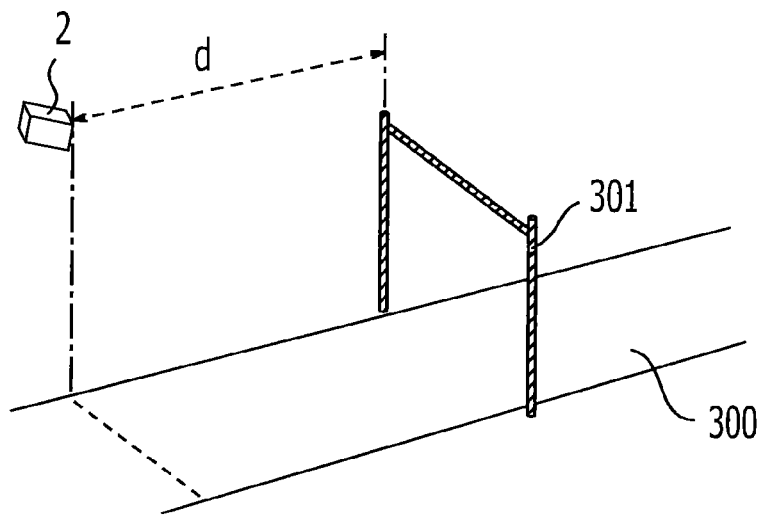
FIG. 3A depicts a diagram illustrating an example of a positional relationship between a radar and a stationary object.
Figure 3B:
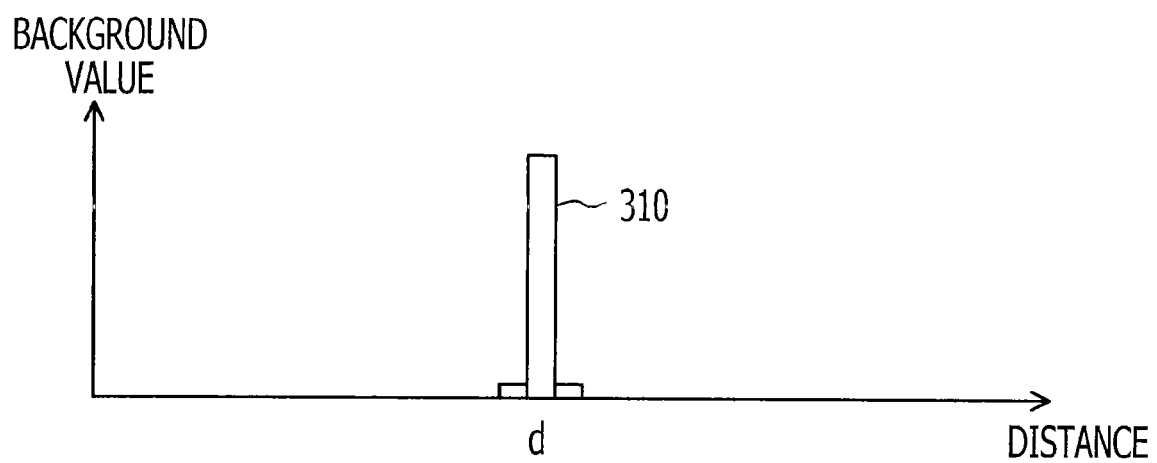
FIG. 3B illustrates an example of background data that corresponds to FIG. 3A.

Referring to FIGS. 3A and 3B, descriptions are made regarding the background data. FIG. 3A depicts a diagram illustrating an example of the positional relationship between the radar 2 and a stationary object.

As shown in FIG. 3A, a support 301 for displaying information, such as traffic guide map, is installed across a road 300 within the detection range of the radar 2 at a position separated from the radar 2 by a distance d, and the support 301 reflects radar waves. As a result, whenever the radar 2 generates measurement data, the reception level signal of the measurement data at the position separated by the distance d has a strength equivalent to the radar wave reflected by the support 301 so long as another object reflecting the radar wave is not present at the position. Therefore, each time measurement data is acquired, when a frequency in which generation of a reception level signal having a given strength or more is counted every distance from the radar 2, a frequency of generation of a reception level signal having the given strength or more is increased at the distance d. Meanwhile, since the traveling vehicle moves with the passage of time, even though the frequency in which generation of the reception level signal having the given strength or more is counted every distance, the frequency of generation of a reception level signal having the given strength or more in the distance from the radar 2 to the traveling vehicle is low. As such, when a frequency in which the generation of a reception level signal having the strength of a given threshold Thd or more is counted for each distance, it may be seen that the stationary object is present at an area having a high generation frequency. Therefore, the background data is generated as data representing the generation frequency of the reception level signal having the strength of the given threshold Thd or more for each distance from the radar 2.

FIG. 3B is a diagram illustrating an example of the background data corresponding to FIG. 3A. In FIG. 3B, the horizontal axis represents distance and the vertical axis represents background values. The background values correspond to the generation frequency in the measurement data of the reception level signal having the given strength or more. As shown in FIG. 3B, in a background data 310, the background value is high at the distance d, which is the distance from the radar 2 to the support 301, and the background value is almost zero (0) in distances other than the distance d. The reason why the background value right before and after the distance d is slightly high, is, for example, that a measurement error is included in the distance to the support 301, which is measured by the radar 2.

Accordingly, the moving object detecting apparatus 1 excludes a measurement value equivalent to the distance d that has the high background value from the measurement data acquired from the radar 2 when detecting a traveling vehicle, which may prevent the support 301 from being erroneously detected as a traveling vehicle.

However, as described above, when the radar wave reflected by the support 301 is weak, and as a result, the strength of the reception level signal at the distance d in the measurement data varies to become higher or lower than the threshold Thd, the background value is not sufficiently increased. The shape is described with reference to FIG. 4.

Figure 4:
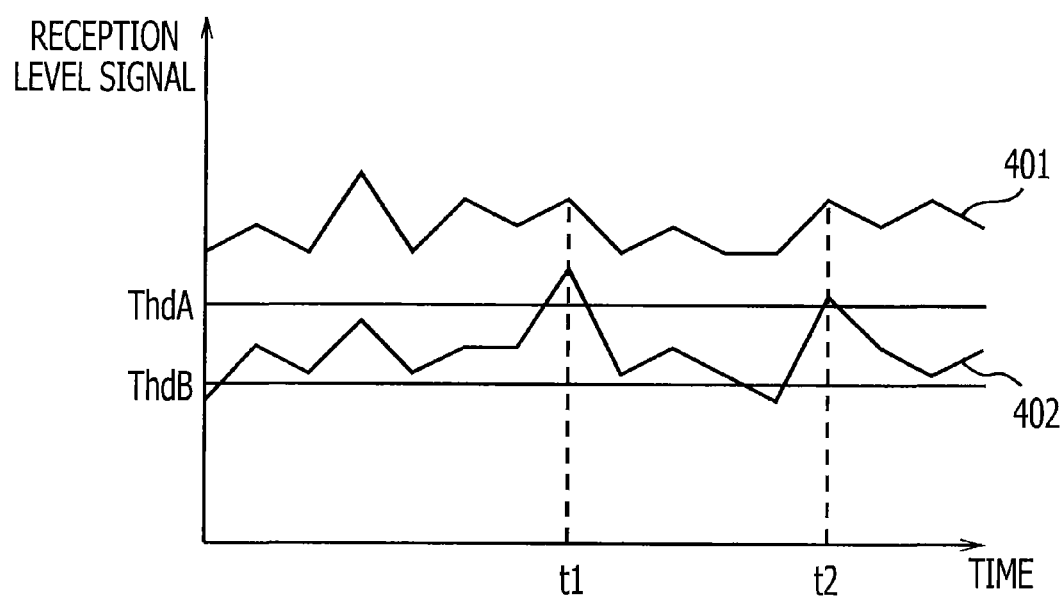
FIG. 4 illustrates an example of the variation over time of the strength of a reception level signal included in measurement data with respect to a stationary object positioned at a given distance from the radar.

FIG. 4 illustrates an example of the strength of a reception level signal included in measurement data according to variation over time with respect to a distance from the radar 2 to a stationary object. In FIG. 4, the horizontal axis represents the time and the vertical axis represents the strength of the reception level signal. A graph 401 indicates the variation over time of the strength of the reception level signal when the reflected wave by the stationary object is sufficiently strong. A graph 402 indicates the variation over time of the strength of the reception level signal when the strength of the reflected wave by the stationary object is not sufficient. A threshold ThdA is a threshold of the reception level signal that a vehicle detecting unit 22 to be described below uses to detect a travelling vehicle, and for example, set as a value corresponding to an upper limit value of the strength of the reception level signal when the travelling vehicle to be detected is not present.

When the reflected wave is sufficiently strong, as shown by the graph 401, even though the reception level signal in the measurement data varies due to effects such as environmental conditions, the reception level signal is always higher than the threshold ThdA. Therefore, even if a lower limit value of the reception level signal received as the background data is the threshold ThdA, the background value in the range from the radar 2 to the stopped object becomes a sufficiently large value. As a result, the moving object detecting apparatus 1 may rarely erroneously detect a stationary object as a travelling vehicle.

However, when the strength of the reflected wave is close to the lower limit value of the strength of the reflected wave detected as the travelling vehicle, the reception level signal may not exceed the threshold ThdA due to the variation in the strength of the reflected wave according to effects such as environmental conditions. In an example shown by the graph 402, the only times when the reception level signal is higher than the threshold ThdA are t1 and t2. In this case, when the lower limit value of the reception level signal received as background data is the threshold ThdA, the background value corresponding to the range from the radar 2 up to the stationary object becomes a small value. Therefore, when a moving object detection process is performed, a measurement value corresponding to the distance from the radar 2 up to the stationary object may not be excluded from the measurement data. As a result, the moving object detecting apparatus 1 may erroneously detect a stationary object as the travelling vehicle at the times t1 and t2.

However, when the lower limit value of the reception signal level received as the background data is a threshold ThdB which is lower than the threshold ThdA, even if the reception level signal corresponding to the stationary object is a level shown in the graph 402, the reception level signal is greater than or equal to the threshold ThdB most of the time. Therefore, the background value in the distance up to the stationary object becomes a sufficiently large value.

As a result, when detecting a vehicle, the background data updating unit 21 sets the threshold ThdB (for example, a first threshold) of the reception level signal received as the background data to a value lower than the threshold ThdA (for example, a second threshold) of the reception level signal. The threshold ThdB is set to a value smaller than threshold ThdA by a value that corresponds to a variation range of the reception level signal caused by environmental conditions or noise overlapped in the reflected wave; for example, to a value smaller than the threshold ThdA by 2 dBmV to 3 dBmV.

Figure 5:
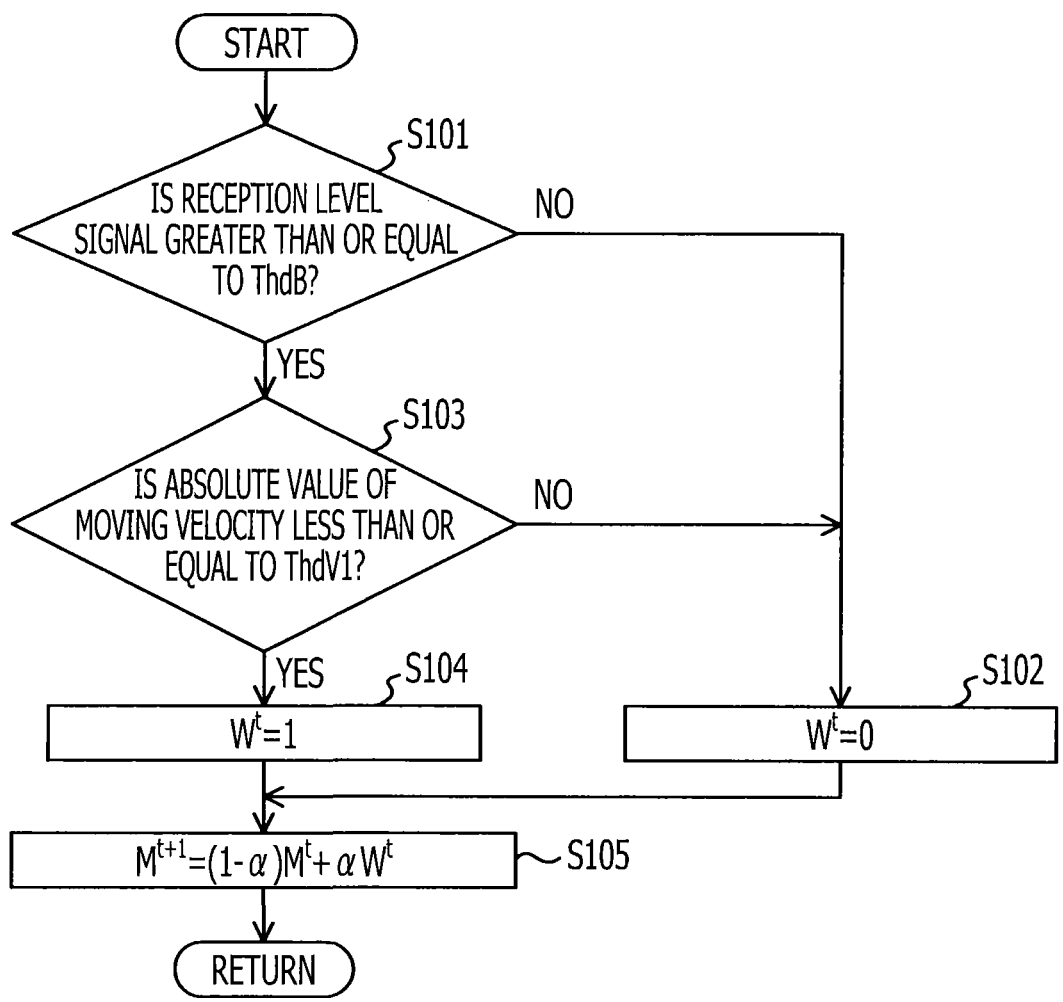
FIG. 5 illustrates an operational flowchart of an updating process for the background data.

FIG. 5 illustrates an operational flowchart of the background data updating process performed by the background data updating unit 21. The background data updating unit 21 performs the background data updating process for each distance from the radar 2 based on the received measurement data each time the control unit 14 receives the measurement data from the radar 2 or for every given period of time, for example, every 1 second, every 30 seconds, or every 1 minute.

The background data updating unit 21 determines whether or not the reception level signal in a specified distance included in the measurement data is greater than or equal to the threshold ThdB (step S101). When the reception level signal is less than the threshold ThdB ("No" at step S101), it is likely that a stationary object will not be present at a position separated from the radar 2 by the specified distance. Therefore, the background data updating unit 21 sets in the latest measurement data the value of update data $W^t$ that indicates whether an object has been detected as zero (0) (step S102). In the present embodiment, as the value of the update data $W^t$ becomes large, it is more likely that an object is present at the position corresponding to $W^t$.

Meanwhile, when the reception level signal is greater than or equal to the threshold ThdB ("Yes" at step S101), either a travelling vehicle or a stationary object may be present at the position separated from the radar 2 by the specified distance. Therefore, the background data updating unit 21 determines out of the measurement data whether an absolute value of the moving velocity of an object corresponding to the specified distance is less than or equal to a given speed threshold ThdV1 (step S103). The speed threshold ThdV1 is an upper limit value of the moving velocity of a stationary object with consideration given to measurement error, and is set as, for example, 5 km/h. When the absolute value of the moving velocity of the object corresponding to the specified distance is larger than the speed threshold ThdV1 ("No" at step S103), it is determined that an object separated from the radar 2 by the specified distance is not a stationary object. Therefore, the background data updating unit 21 sets the value of the update data $W^t$ to zero (0) (step S102).

Meanwhile, when the absolute value of the moving velocity of the object corresponding to the specified distance is less than or equal to the speed threshold ThdV1 ("Yes" at step S103), there is a possibility that an object separated from the radar 2 by the specified distance is a stationary object. Therefore, the background data updating unit 21 sets the value of the update data $W^t$ to one (1) (step S104).

After step S102 or S104, the background data updating unit 21 updates the background value of the specified distance in the background data stored in the storage unit 12 according to an equation described below (step S105).

$$M^{(t+1)} = (1-\alpha)M^t + \alpha W^t \quad \text{[equation 1]}$$

In the equation above, $M^t$ represents a background value of the specified distance before updating and $M^{t+1}$ represents a background value of the specified distance after updating. The symbol $\alpha$ is a forgetting coefficient, and is set to, for example, a value in the range of 0.001 to 0.01. As apparently illustrated in Equation (1), the background value is a value in the range of 0 to 1 in the present embodiment. As a result, the background data may indicate the latest situation associated with the position of the stationary object within the detection range of the radar 2. When there is a vehicle that temporarily stops by an object such as a traffic signal, the background value corresponding to the distance from the radar 2 to the vehicle temporarily increases, but when the vehicle moves, the background value decreases. Therefore, for example, by making the forgetting coefficient smaller than an inverse of a number of measurement data acquired during a period in which a vehicle temporarily stops, the background data updating unit 21 may restrict to a low value a background value that corresponds to a vehicle that temporarily stops.

After step S105, the background data updating unit 21 stores the updated background data in the storage unit 12.

The vehicle detecting unit 22 is an example of a moving object detecting unit, and detects a vehicle that travels within the detection range of the radar 2 based on the measurement data every time the control unit 14 receives measurement data from the radar 2.

For example, the vehicle detecting unit 22 removes, from the measurement data, a measurement value for a distance at which the background value included in the background data is greater than or equal to a given threshold Thdr. As a result, the vehicle detecting unit 22 may prevent a stationary object from being erroneously detected as a travelling vehicle. The given threshold Thdr is, for example, experimentally determined to be a small if not minimum value of a background value at the position where the stationary object is present and is set as, for example, a value acquired by multiplying a maximum value which the background value may become by 0.3 or 0.4. The vehicle detecting unit 22, out of remaining measurement values, extracts a measurement value whose reception level signal is greater than or equal to the threshold ThdA, and determines that the travelling vehicle is present in the distance corresponding to the extracted measurement value. The vehicle detecting unit 22 sets the moving velocity corresponding to the extracted measurement value as the velocity of the detected vehicle in the measurement data.

The vehicle detecting unit 22 may determine that the travelling vehicle is present at the distant position from the radar 2 only when the absolute value of the moving velocity corresponding to the extracted measurement value is greater than or equal to a given speed threshold ThdV2. The speed threshold ThdV2 is set as, for example, a value acquired by subtracting a given offset value (for example, 20 km/h to 30 km/h) from a mean velocity of a vehicle that travels within the detection range of the radar 2. For example, when it is assumed that a vehicle travelling within the detection range of the radar 2 does not stop, the vehicle detecting unit 22 detects only an object having a given velocity or more as a moving object to further reduce the possibility that a stationary object might be erroneously detected as a travelling vehicle.

Meanwhile, when the moving object detecting apparatus 1 also detects a vehicle that temporarily stops, due to either a traffic signal or congestion, as a travelling vehicle, it may be desirable that the vehicle detecting unit 22 may detect a vehicle without using the moving velocity as described above in order to prevent a vehicle that temporarily stops from not being detected.

The vehicle detecting unit 22 may output the distance from the radar 2 to the detected vehicle and the moving velocity of the vehicle to another apparatus through the output unit 13.

Figure 6:
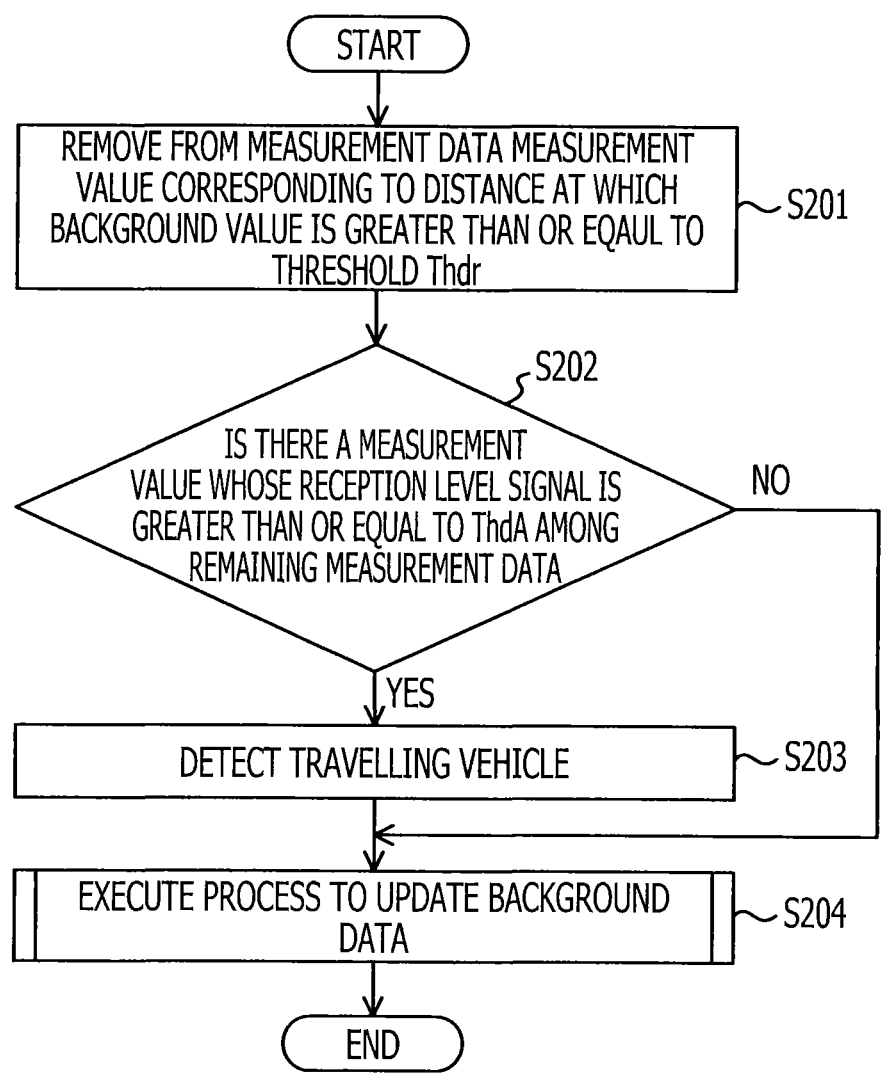
FIG. 6 illustrates an operational flowchart for a moving object detection process.

FIG. 6 illustrates an operational flowchart for the moving object detection process performed by the control unit 14, which performs the moving object detection process according to the operational flowchart based on the latest measurement data whenever measurement data is acquired from the radar 2.

The vehicle detecting unit 22 of the control unit 14 removes, from the latest measurement data, a measurement value corresponding to a distance whose background value included in the background data is greater than or equal to the threshold Thdr (step S201). The vehicle detecting unit 22 determines whether there is a measurement value whose reception level signal is greater than or equal to the threshold ThdA among the remaining measurement values (step S202). When there is the measurement value of which the reception level signal is greater than or equal to the threshold ThdA ("Yes" at step S202), the vehicle detecting unit 22 determines that candidate data for a travelling vehicle is present at the distance corresponding to the measurement value whose reception level signal is greater than or equal to the threshold ThdA (step S203). The vehicle detecting unit 22 outputs the distance and the moving velocity corresponding to the detected vehicle by, for example, the method disclosed in Japanese Laid-Open Patent Publication No. 2002-99986, to another apparatus through the output unit 13.

After step S203 or at step S202, when it is determined that there is no measurement value whose reception level signal is greater than or equal to the threshold ThdA ("Yes" at step S202), the background data updating unit 21 of the control unit 14 performs the background data updating process (step S204). Thereafter, the control unit 14 terminates the moving object detection process.

The control unit 14 may perform the process of step S204 before the processes of steps S201 to S203. Alternatively, the control unit 14 may perform the process of step S204 in parallel with the process of steps S201 to S203.

As described above, the moving object detecting apparatus sets the threshold of the reception level signal treated as background data to a value lower than the threshold of the reception level signal used to detect a moving object. As a result, the moving object detecting apparatus may represent the threshold of the reception level signal in the background data, even for a stationary object for which, due to effects such as environmental conditions, the strength of the reception level signal corresponding to the strength of the reflected wave by the stationary object varies to become higher or lower than the threshold for detecting moving objects. As a result, the moving object detecting apparatus may prevent a stationary object from being erroneously detected as the travelling vehicle.

According to the illustrative embodiments of the present disclosure as described above, the moving object detecting apparatus may prevent a stationary object that is present within the detection range of the radar from being erroneously detected as a moving object.

The present disclosure is not limited to the illustrative embodiment described above. For example, according to a modified example, the transmission antenna and reception antenna of the radar may have directionality, and radiate the radar wave and receive the reflected wave in a given direction. In this case, the radar may further include driving mechanisms for the transmission antenna and the reception antenna that scan a given horizontal angle range at a given cycle (for example, 100 msec). In this case, with respect to each of a plurality of positions set at a given scanning angle interval and a given distance interval, the measurement data is a group of data that includes a measurement value which in turn includes an azimuth and a distance from the radar up to the position, a reception level signal indicating the strength of the reflected wave, and the moving velocity of an object positioned at the position.

In this case, the background data has a background value for each pair of a distance at a given distance interval and an azimuth at a given scanning angle interval. The background data updating unit also updates the background value for each pair of distance and azimuth. The object detecting unit examines whether the background value is greater than or equal to the threshold Thdr for each pair of distance and azimuth, and after removing measurement values that correspond to a pair of distance and azimuth whose background value is greater than or equal to the threshold Thdr from the measurement data, detects a travelling vehicle based on remaining measurement values.

According to another modified example, when there is a measurement value whose reception level signal is greater than or equal to the threshold ThdB and whose absolute value of the moving velocity is less than or equal to the threshold ThdV1, the background data updating unit may add a given value in the range of 0 to 1 to data used to update an adjacent distance corresponding to the measurement value. As a result, the background data updating unit may represent in the background data position variation of the stationary object caused by effects such as the measurement error of the radar.

According to yet another modified example, the background data updating unit may detect a measurement value whose reception level signal is greater than or equal to the threshold ThdB from each of a plurality of measurement data acquired during a given period that includes the time when the latest measurement data was acquired. For each distance from the radar during the given period, the background data updating unit may acquire as a background value the generation frequency of a reception level signal whose strength is greater than or equal to the threshold ThdB.

According to still another modified example, the radar may be a type that uses a pulse compression method or a two-frequency continuous wave (CW) method. In this case, the control unit receives at a given cycle measurement data that includes a reception level signal representing the strength of a reflected wave for each of a plurality of positions from the radar that are set with a given distance interval. The vehicle detecting unit detects an object positioned at a distance whose background value is less than the threshold Thdr and whose reception level signal is greater than or equal to the threshold ThdA, as a candidate for a travelling vehicle. In this case, the vehicle detecting unit, for example, compares a past position of a candidate vehicle that was detected in measurement data acquired a given number of times before (for example, one to several times before) with the present position of the candidate vehicle detected in the latest measurement data. The vehicle detecting unit divides a distance from the present position up to a past position closest to the present position by the measurement cycle of the radar to estimate the velocity of the object at the present position and sets the object at the present position as a travelling vehicle when the estimated value is within a given range.

The object to be detected is not limited to a travelling vehicle, and may be any object that reflects radar waves and moves.

A computer program having commands that implement the function of the control unit according to the illustrative embodiments or the modified examples in a computer may be provided in a form that is written on a recording medium such as a magnetic recording medium, an optical recording medium, or a non-volatile semiconductor memory.

All examples and conditional language recited herein are intended for pedagogical purposes to aid the reader in understanding the invention and the concepts contributed by the inventor to furthering the art, and are to be construed as being without limitation to such specifically recited examples and conditions, nor does the organization of such examples in the specification relate to a showing of the superiority and inferiority of the invention. Although the embodiments of the present invention have been described in detail, it should be understood that the various changes, substitutions, and alterations could be made hereto without departing from the spirit and scope of the invention.

What is claimed is:

1. An apparatus that detects a moving object, comprising:
    an interface unit configured to receive, from a radar, measurement data that includes at least one distance from the radar paired with a reception level signal that indicates a strength of a radar wave reflected by a reflecting object located at the distance from the radar;
    a background data updating unit configured to detect the reception level signal that is greater than or equal to a first threshold from each of a plurality of the measurement data and acquire, for each distance from the radar, a background value that indicates a generation frequency for levels of the reception level signal that become greater than or equal to the first threshold; and a moving object detecting unit configured to detect the reflecting object as a moving object, the reflecting object having the background value that is less than a background value corresponding to a stationary object that is located in same distance of the reflecting object, wherein the reflecting object is one of a plurality of reflecting objects that are located at a distance that corresponds to the reception level signal that has a strength greater than or equal to a second threshold in the measurement data, the second threshold being higher than the first threshold.

2. The apparatus of claim 1, wherein the first threshold is set to be smaller than the second threshold only by a value corresponding to a variation range of the strength of the radar wave reflected by the reflecting object and received by the radar.

3. A method for detecting a moving object, comprising:
receiving, from a radar, measurement data that includes at least one distance from the radar paired with a reception level signal that indicates the strength of a radar wave reflected by a reflecting object located at the distance from the radar;
detecting the reception level signal that is greater than or equal to a first threshold from each of a plurality of measurement data and acquiring a background value that indicates a generation frequency of the reception level signal that is greater than or equal to the first threshold, for each distance from the radar; and
detecting the reflecting object as a moving object, the reflecting object having the background value that is less than a background value corresponding to a stationary object that is located in same distance of the reflecting object, wherein the reflecting object is one of a plurality of reflecting objects that are located at a distance that corresponds to the reception level signal that has a strength greater than or equal to a second threshold in the measurement data, the second threshold being higher than the first threshold.

4. A non-transitory computer-readable recording medium storing a computer executable program that, when executed, causes a computer to perform a method for detecting a moving object, the method comprising:
receiving, from a radar, measurement data that includes at least one distance from the radar paired with a reception level signal that indicates the strength of a radar wave reflected by a reflecting object located at the distance from the radar;
detecting the reception level signal that is greater than or equal to a first threshold from each of a plurality of measurement data and acquiring a background value that indicates a generation frequency of the reception level signal that is greater than or equal to the first threshold, for each distance from the radar; and
detecting the reflecting object as a moving object, the reflecting object having the background value that is less than a background value corresponding to a stationary object that is located in same distance of the reflecting object, wherein the reflecting object is one of a plurality of reflecting objects that are located at a distance that corresponds to the reception level signal that has a strength greater than or equal to a second threshold in the measurement data, the second threshold being higher than the first threshold.

* * * * *